United States Patent [19]
Huignard et al.

[11] Patent Number: 4,864,312
[45] Date of Patent: Sep. 5, 1989

[54] DEVICE FOR OPTICAL CONTROL OF A BEAM-SCANNING ANTENNA

[75] Inventors: Jean P. Huignard, Paris; Claude Puech, Longjumeau, both of France

[73] Assignee: Thomson-CSF, Paris, France

[21] Appl. No.: 180,313

[22] Filed: Apr. 11, 1988

[30] Foreign Application Priority Data

Apr. 14, 1987 [FR] France ................. 87 05267

[51] Int. Cl.[4] ............................... H01Q 3/22
[52] U.S. Cl. ...................... 342/375; 342/368; 455/612
[58] Field of Search ......... 342/368, 200, 375, 108, 342/374; 455/612, 609

[56] References Cited

U.S. PATENT DOCUMENTS

| | | |
|---|---|---|
| 3,878,520 | 4/1975 | Wright et al. |
| 4,028,702 | 6/1977 | Levine ................. 342/368 |
| 4,238,797 | 12/1969 | Shreve . |
| 4,241,351 | 12/1980 | Shreve ................. 342/368 |
| 4,258,363 | 3/1981 | Bodmer et al. ......... 342/368 |
| 4,583,096 | 4/1986 | Bellman et al. ........ 342/368 |
| 4,739,334 | 4/1988 | Soref ................. 342/368 |

OTHER PUBLICATIONS

*Journal of Lightwave Technology*, vol. LT-3, No. 5, Oct. 1985, pp. 992–998, New York, U.S.; R. A. Soref: "Voltage-Controlled Optical/RF phase shifter".

*Radar-82, International Conference*, Oct. 18–20, 1982, pp. 408–412, London, GB; J. R. Forrest et al: "Optical Fibre Networks for Signal Distribution and Control in Phased Array Radars", p. 441.

*Journal of Optics*, vol. 15, No. 6, Nov./Dec. 1984, pp. 403–407, Paris, FR; J. P. Goedgebuer et al: "Nouvelle Technique de Modulation Electro-Optique Adaptee aux Sources a Spectre Large".

Levine, Use of Fiber Optic Frequency and Phase Determining Elements in Radar, 5/79 pp. 436–443.

*Primary Examiner*—Thomas H. Tarcza
*Assistant Examiner*—David Cain
*Attorney, Agent, or Firm*—Oblon, Spivak, McClelland, Maier & Neustadt

[57] ABSTRACT

Beam-scanning of an antenna by means of microwave phase shifts is achieved by N electrooptical modulators which receive two collinear beams having different frequencies. The modulators define optical paths having different wavelengths. N photodetectors make it possible to receive the beams reflected by the modulators and to control antenna elements during a 2 $\pi$ phase excursion.

13 Claims, 4 Drawing Sheets

DEVICE FOR OPTICAL CONTROL OF A BEAM-SCANNING ANTENNA

BACKGROUND OF THE INVENTION

This invention relates to a device for optical control of a beam-scanning antenna and more particularly to a device in which its optical means are employed for controlling the radiation pattern of a radar antenna which transmits in the 1–12 GHz frequency band, for example. The proposed device performs the function in particular of angular scanning of the radar beam by controlling the phase of each element of the antenna.

The invention is applicable to electronic beam-scanning antennas in which each radiating element is controlled electronically and independently in order to produce a scan for the antenna. Electronic scanning makes it possible to modify the position of the scanning beam. Beam scanning has to be performed at a high rate in comparison with the repetition frequency of the radar. In order to obtain rapid scanning, the known method of electronic control employed in the prior art consists in producing action on the respective phases of the controls of the various radiating elements It is therefore necessary to carry out a rapid phase-control operation. To this end, a microwave phase-shifter is associated with each antenna element. These phase-shifters have the disadvantage of high current consumption and are also cumbersome.

In the device for optical control of antenna elements in accordance with the invention, it is possible to avoid the use of these microwave phase-shifters.

SUMMARY OF THE INVENTION

The invention accordingly relates to a device for optical control of a beam-scanning antenna in which provision is made for an array of antenna elements, the different elements being arranged in a predetermined order and each controlled by a microwave generator, said device being distinguished by the fact that it also comprises:

a light source for simultaneously emitting at least two collinear beams having different frequencies;

optical transmission means for determining optical paths which correspond in number to the microwave generators, which are arranged in the same predetermined order as the antenna elements and each of which has an entrance for receiving the two beams emitted by the laser source and re-transmitting them to an exit, and each optical path of predetermined rank (2, for example) being of greater length than the optical path of lower rank according to the example considered;

an array of photodetectors, each photodetector being optically coupled with one exit of an optical path, the function of each photodetector being to detect the light intensity derived from said exit and to deliver to a microwave generator an intensity control signal having a frequency which represents the beat arising from the two frequencies of the two beams emitted by the laser source.

DESCRIPTION OF THE PREFERRED EMBODIMENTS

Figure 1:
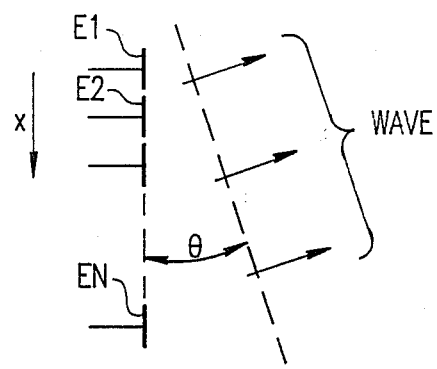
FIG. 1 is a simplified representation of an electronic beam-scanning antenna in accordance with the prior art.
Figure 2:
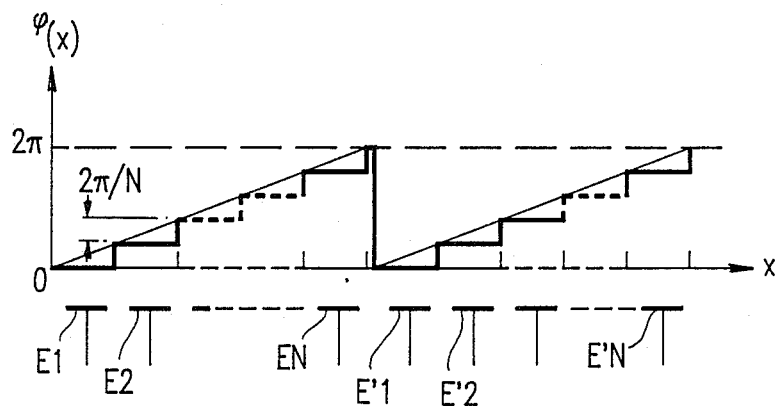
FIG. 2 is an operating diagram of an electronic beam-scanning antenna in accordance with the prior art.

Referring to FIGS. 1 and 2, there will first be given a general description of a device for controlling an electronic beam-scanning antenna.

FIG. 1 illustrates a linear array of antenna elements E1 to EN in which the principal transmission lobe extends in a direction such that the radiated wave plane makes an angle 8 with the plane of antenna array. This radiation pattern results from individual control of each element of the antenna by a linear phase law:

$$\varphi(x) = \frac{2\pi}{\lambda} \times \chi \times \theta$$

In this formula, $\lambda$=length of transmitted wave, $\theta$=angle made by the radiated-wave plane with the plane of the array of antenna elements, $\chi$=length of a portion of the antenna array in which a phase shift of $2\pi$ radians is obtained.

In practice, transmission of the beam about a direction will be obtained by limiting the phase excursion to the interval $0-2\pi$ and by controlling each elementary antenna by amplitude increments $2\pi/N$, where N is the number of quantization levels of the phase law. As shown in FIG. 2, there is obtained in the case of a series of elements E1 to EN a phase control law in which control of each element is phase-shifted by $2\pi/N$ with respect to the adjacent elements. The same applies to another series of elements E'1 to E'N.

The addressing techniques based on a sampling function of the spatial distribution of the phase therefore permit control of the radiation pattern of the antenna array and carry out in particular the beam deflection and/or focusing functions. These principles therefore call for utilization of microwave phase-shifting networks which induce, for example, when N=4, the phase shifts 0; $\pi/4$; $3\pi/4$; $2\pi$.

These microwave phase-shifting networks are cumbersome, costly and require high consumption of electric current.

It is for this reason that the aim of the invention is to provide an optical-beam phase control which makes it possible to overcome the disadvantages of known systems.

Figure 3:
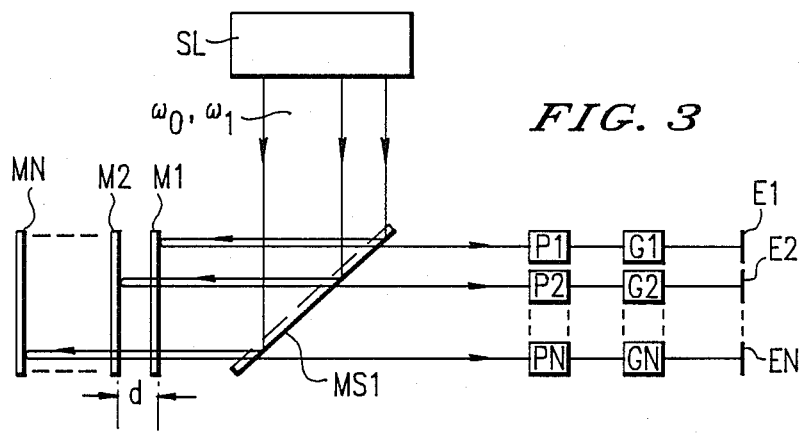
FIG. 3 is a schematic illustration of the device in accordance with the invention for optical control of an electronic beam-scanning antenna.

FIG. 3 illustrates one example of construction of the device in accordance with the invention. This device includes:

a laser source SL which emits two collinear beams simultaneously at the frequencies $\omega_0$ and $\omega_1 = \omega_0 + \Delta\omega$;

an array of N spatial modulators M1, M2, ... MN which are parallel to each other and spaced apart at a distance d. Each spatial modulator is constituted by n×n cells, the reflectivity of which can be controlled by means of voltages $V_x V_y$ applied to row-and-column electrodes;

a semireflecting mirror MS1 which serves to reflect the two beams emitted by the laser source toward the modulators;

an array of n × n photodetectors which receive by means of the semireflecting mirror MS the optical signals at frequencies $\omega_0$, $\omega_1$ which have been subjected respectively to phase shifts $\varphi_o$ and $\varphi_1$ such that:

$$\varphi_o = \frac{\omega_o}{c} 2d(N-1)$$

$$\varphi_1 = \frac{\omega_1}{c} 2d(N-1)$$

In these formulae, c represents the velocity of light, d represents the distance between two modulators and N represents the number of modulators;

an array of n×n microwave generators controlled by the signal delivered by each photodetector. In particular, the phase of the beat signal between the two beams at frequencies $\omega_0$ and $\omega_1$ will serve as a pilot for the relative phases between n×n elements of the antenna.

As illustrated in FIG. 3, each modulator M1 to MN reflects part of the beams received from the source SL to a photodetector P1 to PN while allowing the remainder of the beams to pass to the next modulator. For example, the modulator M1 reflects part of the beams and transmits the remainder of the light toward the modulators M2 to MN. The photodetectors P1 to PN receive light beams which have been subjected to more or less substantial phase shifts as a result of the distance traveled by the light beams according to the modulator which has reflected the light.

The signal received by each photodetector as a result of beating of the waves at frequencies $\omega_0$ and $\omega_1$ is written:

$$\xi = \xi_0 [e^{j\omega_0(t-z/c)} + e^{j\omega_1(t-z/c)}]$$

In this formula,
t = time interval at a given instant,
z = distance traveled by the light at the instant t,
c = velocity of the light.

The detected photocurrent iph resulting from this wave beat is proportional to the square of $\xi$ $$i_{ph} \alpha \| \xi \|^2$$

The photocurrent iph is therefore proportional to:

$$i_{ph} \alpha 1 + \cos[\Delta\omega \cdot t - \Delta\omega \cdot z/c]$$

The phase $\varphi$ of the microwave signal having a frequency $\Delta\omega$ is therefore a function of the distance traveled by the beams derived from the source SL and is therefore determined by the distance d between spatial modulators:

$$\phi = 2\pi\Delta\omega z/c$$

If N phase levels are chosen as shown in FIG. 2, the distance d between spatial modulators M1 to MN resulting in an increment of $2\pi/N$ has the value:

$$d = \frac{c}{2\pi\Delta\omega}$$

In the schematic diagram of FIG. 3, the phase shift $\varphi$ between the wave which has been subjected to a reflection from the spatial modulator M1 ($\varphi=0$, phase reference) and the wave reflected from any point of a special modulator P is written:

$$\phi_p = p\frac{2\pi}{N}$$

where p is the order number of the spatial modulator P.

Figure 5:
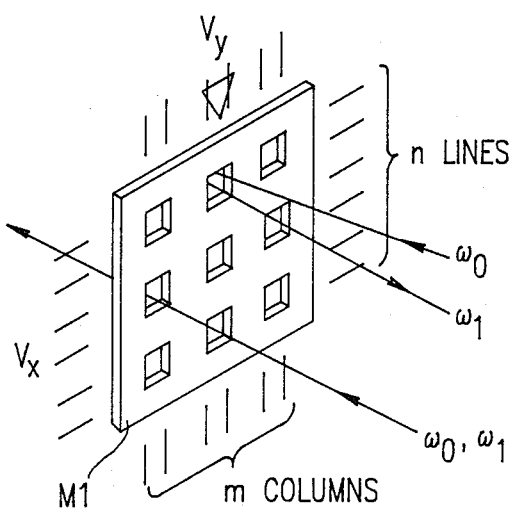
FIG. 5 shows one example of construction of a modulator employed in an optical control device in accordance with the invention.

One example of construction of a spatial modulator is illustrated in FIG. 5. This modulator consists of a matrix of elements controlled by row-and column electrodes. In this matrix having n rows and m columns, one point of intersection alone is controlled for reflection of light. The other points of intersection are controlled for transmission of light.

The spatial modulator therefore ensures controlled reflection of the incident wave at a single point having coordinates X-Y under the action of applied voltages $V_X$ and $V_Y$. The number of points m×n corresponds to the number of antenna elements, namely:

$$m.n \approx \frac{3S}{\lambda^2}$$

in the case in which the distance between elements is of the order of 0.6λ:
S: surface area of the antenna
λ: transmission wavelength.

Provision can also be made for a number n of rows equal to the number of columns. We then have:

$$n^2 = \frac{3S}{\lambda^2}$$

For the construction of spatial modulators, recourse may be had to a number of different physical effects.

The physical effects which may be utilized for implementation of this function are as follows:

variation of refractive index in the liquid crystals resulting in a variation of reflectivity of the substrate/liquid crystal interface ($\Delta n \approx 0.2$);

electroreflectance in semiconductor materials and in particular in quantum multiwell structures.

Figure 4:
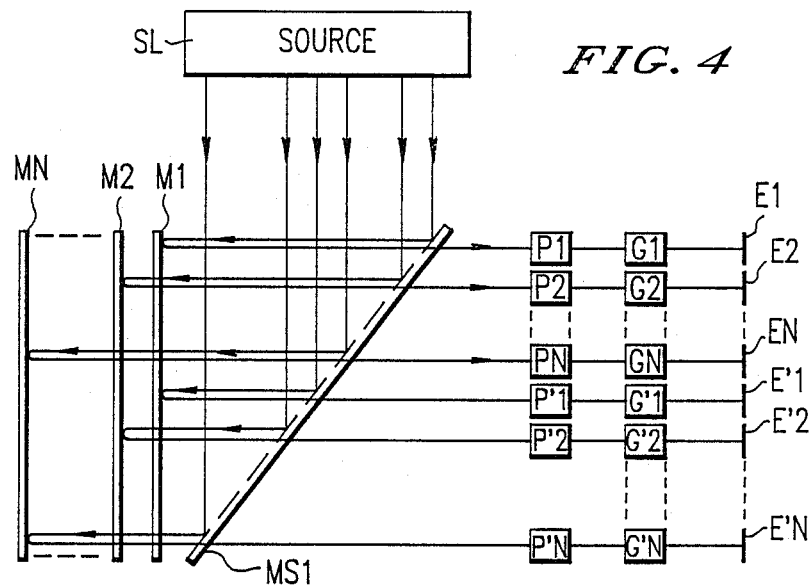
FIG. 4 is a schematic illustration of a more complete device for optical control of an electronic beam-scanning antenna.

Provision can also be made for several groups of antenna elements each controlled on a phase shift of $2\pi$. In FIG. 4, for example, there are shown two groups of antenna elements E1 to EN and E'1 to E'N controlled by two groups of photodetectors P1 to PN and P'1 to P'N, each group being controlled by the same array of spatial modulators M1 to MN.

Figure 6:
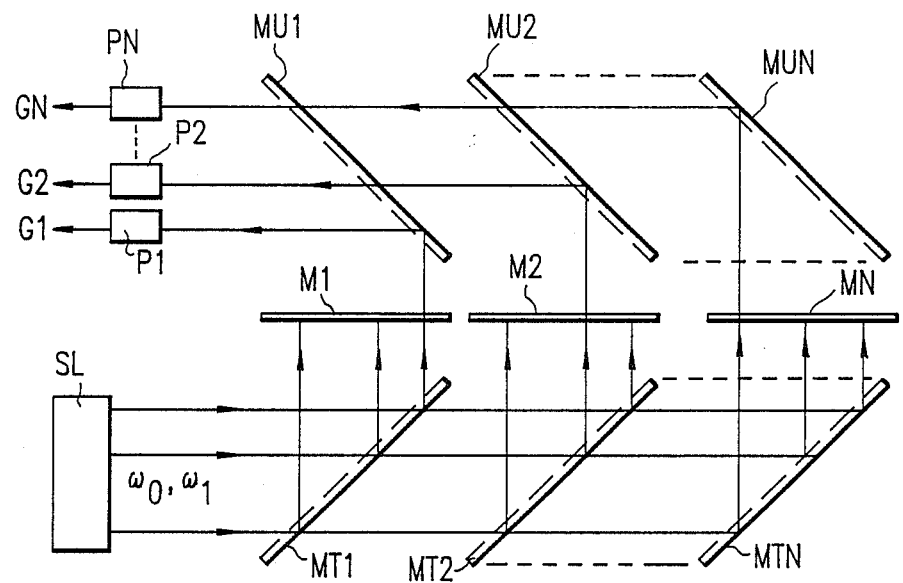
FIG. 6 shows an alternative embodiment of a device in accordance with the invention for optical control of an electronic beam-scanning antenna.

Reference being made to FIG. 6, an alternative embodiment of the device in accordance with the invention will now be described.

In this configuration, all the spatial modulators M1, M2 to MN are illuminated simultaneously by transmission from semitransparent plates MT1, MT2, ... MTN and from a single laser source which emits at the two frequencies $\omega_0$ and $\omega_1$. The semitransparent plates are in parallel alignment in the direction of the beams emitted by the source SL. With each modulation M1 to MN is associated one semitransparent plate MT1 to MTN.

The spatial modulator operates by local variation of transmission controlled under the action of applied voltages $V_X$ and $V_Y$ A certain number of these devices at present in existence are based on the following effects:

birefringence induced in nematic liquid crystals addressed by thin-film transistor (TFT),
controlled diffusion in smectic liquid crystals,
local membrane deformation,
birefringence induced by magnetooptic effect.

Depending on the devices employed, the switching times of an elementary point vary from $\tau = 10$ ns (magnetooptic, semiconductor devices . . . ) to $\tau = 10$ ms (liquid crystals).

With each spatial modulator M1 to MN is associated another semitransparent mirror MU1 to MUN located on the other side of the spatial modulator with respect to the semitransparent mirrors MT1 to MTN. The semitransparent mirrors MU1 to MUN are parallel and aligned in the same direction so as to reflect the light toward the photodetectors P1 to PN, the outputs of which are connected to the microwave generators G1 to GN (not shown in the drawings).

Control of the modulators M1 to MN is such that each modulator transmits part of the light beams emitted by the source to a single photodetector.

The photodetectors P1 to PN receive light beams which have traveled along different paths, the length of the paths being such as to increase with the order numbers 1 to N of the photodetectors P1 to PN. The path differences and consequently the respective positions of the modulators are intended to obtain between two adjacent modulators a phase shift of $2\pi/N$, namely a phase shift of $2\pi$ between the modulator M1 and the modulator MN.

Figure 7:
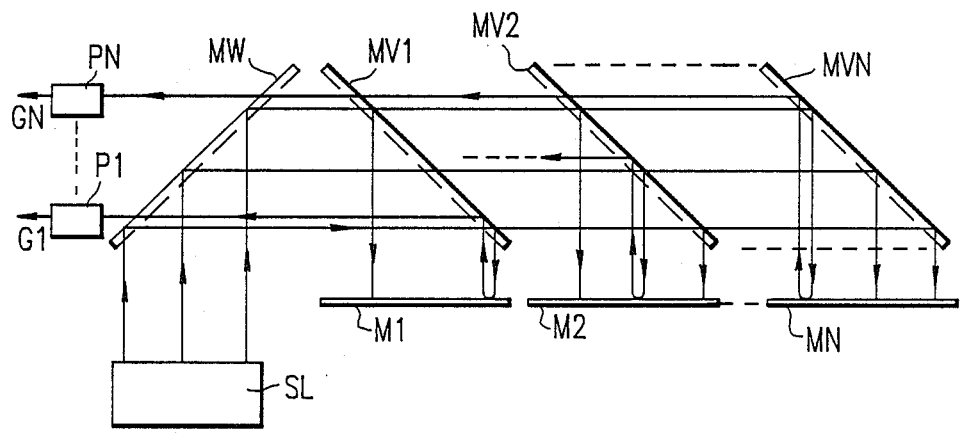
FIG. 7 shows another alternative embodiment of a device in accordance with the invention for optical control of an electronic beam-scanning antenna.

Referring now to FIG. 7, it is apparent that, in accordance with another alternative embodiment of the invention, the system of FIG. 6 is also applicable by making use of modulators which operate in reflection.

The modulators M1, M2, . . . MN are aligned in the same plane and in the same direction. The light source SL emits the two collinear light beams having frequencies $\omega_0$ and $\omega_1$ toward a semireflecting mirror MW. This mirror retransmits the two beams in a direction parallel to the direction of alignment of the modulators M1 to MN. With each modulator M1 to MN is associated a semireflecting mirror MV1 to MVN. The mirrors MV1 to MVN are aligned in the direction of the beams and each mirror reflects part of the light beams toward the associated modulator. Each modulator is controlled so as to ensure that only one of these zones (or part of its surface) reflects part of the beams toward the associated mirror The associated mirror reflects this portion of beam toward a photodetector P1, . . . PN via the semireflecting mirror MW. Thus the modulator M1 reflects part of the beams having frequencies $\omega_0$ and $\omega_1$ toward the photodetector P1 and the modulator MN reflects another part toward the photodetector PN.

In the case of frequencies below 4 GHz (S-band), the two waves $\omega_0$ and $\omega_1$ are readily generated by an acoustooptic cell controlled by a microwave signal $\Delta\omega = \omega_1 - \omega_0$. Ultrasonic absorption limits the use of these cells in the case of higher frequencies (4 to 12 GHz). In this field, the desired frequency difference can be obtained by:

association of Bragg cells,
beating between two modes of one and the same laser cavity (gas laser, semiconductor laser),
beating between two independent single-frequency lasers having a frequency difference equal to $\Delta\omega$ (semiconductor lasers).

An advantageous improvement in the device consists in making use of a network of $n^2$ single-mode optical fibers having the same length for transmission of the signal to the array of photodetectors. These fibers make the transmission portion of the antenna independent of the optical processor which has the function of controlling phase shifts.

Figure 8:
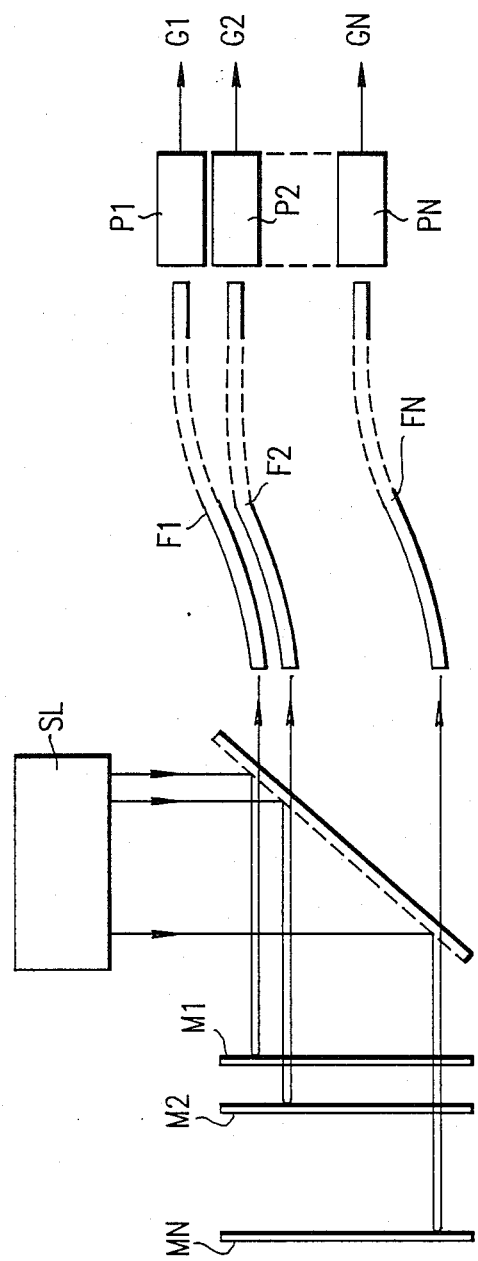
FIG. 8 illustrates an alternative embodiment of the optical control device of FIG. 3 as also applicable to the other exemplified embodiments.

By applying this arrangement to the system of FIG. 3, there is obtained a system as illustrated in FIG. 8 in which the different portions of light beams reflected from the modulators M1, M2, . . . MN are retransmitted by fibers F1, F2, . . . FN to the photodetectors P1, P2, . . . PN. Taking into account the foregoing description, the different fibers F1, F2, . . . FN must have the same length unless it is desired that they should introduce phase shifts, in which case provision will be made for fibers having different lengths.

By way of non-limitative example, there will now be given a numerical example of construction which serves to illustrate the invention.

Provision is made for an antenna having a surface area $S = 10$ m$^2$. The detection frequency must be $\Delta f = 5$ GHz, namely a wavelength transmitted by the antenna of $\lambda = 6$ cm.

The number of antenna elements in respect of a spacing of elements equal to $0.6\lambda$ is:

$$n^2 = 3S\lambda^{-2}$$

In the example of construction shown in FIG. 3 and assuming that there are four phase levels (N=4), the distance d between spatial modulators is:

$$d = \frac{k\lambda}{2} + \frac{C}{2N\Delta F}$$

$$d_{(cm)} = \frac{k\lambda}{2} + 0.75$$

The optical power at the receiver for detecting beats between the two light waves having a frequency $\omega_0$ and $\omega_1$ such that: $\Delta\omega_1 \omega_0 = 5$ GHz and in the case of a signal/noise ratio = S/N = 30 dB has the value: $p_o = 10$ µw.

The laser power emitted at the frequencies $\omega_0$ and $\omega_1$ must be:

$$P_L = n^2_O$$

whence:

$$P_L = 100 \text{ mW}$$

In order to obtain the frequency difference, there is therefore employed a frequency translator having two Bragg cells of LiNbO$_3$ operating at 2.5 GHz.

The spatial modulators will each be in the form of a matrix of points with a number of points equal to 100×100. The dimension of each point can be 30×30 µm.

The device for controlling the scan of an antenna as described in the foregoing offers the following advantages:

Control of the phase of the microwave signal by optical time-delays which are programmable on spatial modulators. The device accordingly avoids the use of microwave phase-shifters and their supply systems.

The spatial modulators illuminated by the laser source can be replaced by two-dimensional networks of semiconductor lasers.

It is possible to vary the frequencies $\omega_0$ and $\omega_1$ of the incident beam (frequency agility).

It is readily apparent that the foregoing description has been given solely by way of example and not any limiting sense. Other alternative embodiments may accordingly be contemplated without thereby departing either from the scope or the spirit of the invention and the numerical values have been given solely for the purpose of illustrating the description.

What is claimed is:

1. A device for optical control of a beam-scanning antenna in which provision is made for an array of antenna elements, the different elements being arranged in a predetermined order and each controlled by a microwave generator, wherein said device further comprises:
a light source for simultaneously emitting at least two collinear beams having different frequencies;
optical transmission means for determining optical paths including a plurality of spatial modulators having controlled transmission and corresponding to the number of optical paths and which correspond in number to the microwave generators, which are arranged in the same order as the antenna elements and each of which has an entrance for receiving the two beams emitted by the laser source and for retransmitting them to a photodetector at an exit, and each optical path of predetermined rank being of greater length than the optical path of lower rank;
an array of photodetectors, each photodetector being optically coupled with one exit of an optical path, the function of each photodetector being to detect the light intensity derived from said exit and to deliver to a microwave generator an intensity control signal having a frequency which represents the beat arising from the two frequencies of the two beams emitted by the laser source.

2. A control device according to claim 1, wherein the transmission means include a number of spatial modulators having controlled reflectivity and corresponding to the number of optical paths, the function of the different modulators being to receive the two beams emitted by the laser source, each modulator being intended to reflect the two beams toward a photodetector.

3. A control device according to claim 2, wherein the distances between the different modulators of the light source are different.

4. A control device according to claim 2, comprising a semireflecting mirror for receiving on the one hand the two light beams derived from the light source and for retransmitting said beams to the modulators and on the other hand the beams reflected from the modulators and for retransmitting them to the photodetectors.

5. A control device according to claim 2, wherein the modulators are modulators of flat shape and disposed in parallel relation.

6. A control device according to claim 2, wherein each modulator has a liquid-crystal cell.

7. A control device according to claim 2, wherein each modulator is a device having birefringence induced by magnetooptic effect.

8. A control device according to claim 2, wherein each modulator is a device of semiconductor materials having reflection properties which are controlled electrically.

9. A control device according to claim 1, wherein the transmission means include one optical fiber in respect of each optical path.

10. A control device according to claim 10, wherein the different modulators are disposed in a predetermined direction and the light source emits said light beams parallel to said direction, the transmission means being further provided with a first series of semireflecting mirrors disposed in the direction of said light beams, each mirror being associated with a modulator so as to transmit part of the two light beams thereto.

11. A device according to claim 11, wherein the transmission means include a second series of semireflecting mirrors each associated with a modulator and disposed in a direction parallel to the directions aforesaid, the light beams which pass through each modulator toward a photodetector being reflected from said second series of semireflecting mirrors.

12. A control device according to claim 2, wherein the modulators are disposed in a predetermined direction and the light source emits said light beams parallel to said direction, the transmission means being provided with a series of semireflecting mirrors disposed in the direction of said light beams, each mirror being associated with a modulator so as to transmit part of the two light beams at right angles to said modulator.

13. A device for optical control of a beam-scanning antenna in which provision is made for an array of antenna elements, the different elements being arranged in a predetermined order and each controlled by a microwave generator, wherein said device further comprises:
a light source for simultaneously emitting at lease two collinear beams for having different frequencies;
optical transmission means for determining optical paths including a plurality of spatial modulators having controlled reflectivity and corresponding to the number of optical paths and which correspond in number to the microwave generators, which are arranged in the same order as the antenna elements an each of which has en entrance for receiving the two beams emitted by the laser source and for retransmitting them to a photodetector at an exit, and each optical path of predetermined rank being of greater length than the optical path of lower rank;
an array of photodetectors, each photodetector being optically coupled with one exit of an optical path, the function of each photodetector being to detect the light intensity derived from said exit and to deliver to a microwave generator an intensity control signal having a frequency which represents the beat arising from the two frequencies of the two beams emitted by the laser source.

* * * * *